United States Statutory Invention Registration [19]

[11] Reg. Number: H366

Seiders [43] Published: Nov. 3, 1987

[54] MICROEMULSIONS CONTAINING SULFOLANES

[75] Inventor: Reginald P. Seiders, Chapel Hill, N.C.

[73] Assignee: The United States of America as represented by the Secretary of the Army, Washington, D.C.

[21] Appl. No.: 28,158

[22] Filed: Mar. 18, 1987

[51] Int. Cl.[4] ..... B01J 13/00

[52] U.S. Cl. ..... 252/312; 252/186.1; 252/102

*Primary Examiner*—John F. Terapane
*Assistant Examiner*—Eric Jorgensen
*Attorney, Agent, or Firm*—Anthony T. Lane; Harold H. Card, Jr.; Edward F. Costigan

[57] ABSTRACT

Novel microemulsions containing sulfolane cr 3-methylsulfolane or both as cosurfactants together with a cationic surfactant such as cetyl trimethylammonium bromide or a nonionic surfactant such as polyoxyethylene octylphenol ether are disclosed. In another aspect of the invention, seawater may be substituted for the aqueous phase. The novel microemulsions of the invention are useful for the detoxification of, e.g., pesticides and chemical warfare agents by enabling their improved removal and/or destruction through one or more of the processes of solubilization, oxidation or hydrolysis.

22 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MICROEMULSIONS CONTAINING SULFOLANES

This invention relates to certain novel microemulsions comprising caticnic surfactants and either sulfolane or 3-methylsulfolane or both as cosurfactants. The aqueous phase of such surfactants may be either fresh water or seawater. As is more fully explained hereinbelow, such novel microemulsions are useful for the solubilization and/or decontamination of toxic chemicals such as pesticides and chemical warfare agents.

The danger to personnel, animal and plant life due to pesticides and chemical warfare agents is only too well known. Methods presently employed for the decontamination of chemical warfare agents include the use of certain solvent mixtures. Typical of such solvent mixtures is DS-2 which contains 70% w/w diethylenetriamine, 28% w/w 2-methoxyethanol and 2% w/w sodium hydroxide. Another such solvent mixture is CD-1 which contains 55 vol % monoethanolamine, 45 vol. % 2-hydroxy-1 -propylamine and 2.5% by wt lithium hydroxide hydrate. See H. M. Quinn, G. T. Davis and I. Wicher, "Compatibility of Plastics with Components of Decontaminating Solutions as Determined by Immersion Testing" published (for limited distribution) March 1981 by U.S. Army Armament Research and Develcpment Command, Chemical Systems Laboratory, Aberdeen Proving Ground, Maryland 21010. See also G. T Davis, F. Block, H. Sommer, and J. Epstein, "Studies on the Destruction of Toxic Agents VX and HD by the All-purpose Decontaminants DS-2 and CD-1" published (for unlimited distribution) May 1975 by Department of the Army, Headquarters, Edgewood Arsenal, Aberdeen Proving Ground, Md. 21010.

However, both solvent mixtures impose difficult logistical burdens on their acquisition and transportation to the site of use in the field. Moreover, both solvent mixtures are highly corrosive to materiel and personnel.

The employment of conventional microemulsion systems containing alkanol cosurfactants has been suggested for the decontamination of chemical warfare agent analogs such as phosphate esters. See "Physicochemical Studies of Solutes in Microemulsions" by R. A. Mackay, Drexel University, Philadelphia, Pennsylvania, published on June 29, 1979 as unclassified material by U.S. Army Research Office, Post Office Box 12211, Research Triangle, N.C. 27709 pursuant to Grant DAAG 29-76-G-0174. However, such a microemulsion system is also unsatisfactory in that the typical alcohol cosurfactant is not stable to oxidants such as hypohalites which are needed in a typical formulation to destroy the contaminating species.

In any event, the cationic surfactant based microemulsions of this invention containing sulfolane or 3-methylsulfolane or both as cosurfactants are not only free from the disadvantages of the microemulsions containing alcohol cosurfactants but they also have the beneficial property of accelerating the hydrolysis of solubilized substrates such as organcphosphates which are analogous to typical chemical warfare agents. Thus, the microemulsions of the present invention result not only in the speedy physical removal of contaminants but in their detoxification as well. Moreover, the microemulsions of the present invention (unlike alcohols) are not as susceptible to oxidation by hypohalites which are necessary to oxidize the contaminating species. Thus, the use of the microemulsions of the present invention in conjunction with oxidants makes the speedier oxidation of contaminating species possible. Moreover, the lower volatility of sulfolane and/or 3-methylsulfolane containing microemulsions of the present invention make them more suitable for use on hot equipment as against alcohol containing microemulsions because of the higher volatility of the usable alcohols. The lower volatility of the microemulsions of the present invention in turn make their use in the field safer because of diminished flammability hazards.

Additionally, since hydrolysis of contaminating species is promoted in the sulfolane and/or 3-methylsulfolane containing microemulsicns of this invention, it is possible to utilize such cationic microemulsions at less basic pH levels than is customary while retaining sufficient reactivity to hydrolyze the contaminating species rapidly. The use of such lower pH levels thus results in decreased corrosivity than is the case, e.g., with DS-2 discussed above.

Moreover, the sulfolane and/or 3-methylsulfolane cosurfactants underlying the microemulsions of the present invention do not attack and remove paints as readily as is the case with DS-2. On the field, this is an important advantage in that the camouflage of armored vehicles, tanks and other equipment is left intact.

Furthermore, the employment of the microemulsions underlying the present invention (containing sulfolane and/or 3-methylsulfolane) results in greater solubility of the chemical warfare agent analog tributylphosphate than is the case with microemulsions which do not contain sulfolane and/or 3-methylsulfolane.

In summary, therefore, the sulfolane and/or 3-methylsulfolane containing microemulsions underlying the present invention result in or make possible speedier rates of solubilization, oxidation and hydrolysis of toxic chemicals used as chemical warfare agents.

According to this invention, a novel microemulsion is provided which comprises from about 1% w/w to about 98% w/w of water or seawater, from about 1% w/w to about 98% w/w of a cationic surfactant and from about 1% w/w to about 98% w/w of a cosurfactant selected from the group consisting of sulfolane, 3-methylsulfolane and mixtures thereof. Alternatively, the cationic surfactant may be replaced in said microemulsion by a nonionic surfactant, e.g., polyoxyethylene octylphenol ether in a range of about 1% w/w to about 40% w/w.

In another aspect of the invention, the cationic surfactant is cetyl trimethylammonium bromide.

In a further aspect of the invention, the microemulsion comprises equal quantities w/w of the cationic surfactant with the sulfolane and/or 3-methylsulfolane cosurfactant.

In yet another aspect of the invention, a process is provided for the detoxification of chemical warfare agents which comprises the step of solubilizing said chemical warfare agents in the microemulsions of the present invention.

In yet another aspect of the invention, a process is provided for the detoxification of chemical warfare agents which comprises the step of hydrolyzing said chemical warfare agents by the microemulsions of the present invention.

In yet another aspect of the invention, a process is provided for the detoxification of chemical warfare agents which comprises the step of oxidizing said chemical warfare agents in the microemulsions of the present invention when used in conjunction with oxidizing media such as hypohalites.

The following illustrative but non-limiting examples will aid in a fuller understanding of the present invention.

EXAMPLE 1

A mixed emulsifier (E) is prepared by mixing together equal quantities w/w of the cationic surfactant cetyl trimethylammonium bromide with sulfolane.

The emulsifier E is mixed with fresh water (W) in the proportions shown below:

| | W wt % | E wt % |
|---|---|---|
| Aqueous Mixture (a) | 20 | 80 |
| Aqueous Mixture (b) | 67 | 33 |
| Aqueous Mixture (c) | 80 | 20 |
| Aqueous Mixture (d) | 92 | 8 |

The resulting aqueous mixtures are titrated with tributylphosphate (TBP) to produce stable single phase microemulsions. The titrations are stopped at the point where the resulting final mixture is no longer in single phase form. The compositions of the resulting final mixtures are as noted below:

| | TBP wt % | Aqueous Mixture (type & wt %) |
|---|---|---|
| (1) | 38 | 62 of (a) |
| (2) | 75 | 25 of (b) |
| (3) | 88 | 12 of (c) |
| (4) | 42 | 58 of (c) |
| (5) | 92 | 8 of (d) |

The results obtained in this example show that an aqueous system containing from about 20% w/w to about 92% w/w water wherein the balance comprises equal parts w/w of cetyl trimethylammonium bromide and sulfolane is capable of forming stable microemulsions with less than its own weight of TBP and spans a range wherein a stable microemulsion also results when the relative quantity of TBP is more than an order of magnitude greater than the weight of the corresponding aqueous system.

EXAMPLE 2

The procedure of Example 1 is repeated except that on this occasion TBP is replaced by chloroethyl ethyl sulfide (CEES) as a chemical warfare agent analog.

Accordingly, the following aqueous mixtures are prepared:

| | W wt % | E wt % |
|---|---|---|
| Aqueous Mixture (a) | 20 | 80 |
| Aqueous Mixture (b) | 50 | 50 |
| Aqueous Mixture (c) | 55 | 45 |
| Aqueous Mixture (d) | 84 | 16 |

The resulting aqueous mixtures are titrated with CEES in accordance with the procedure employed in Example 1 with TBP. The compositions of the resulting final mixtures are as noted below:

| | CEES wt % | Aqueous Mixture (type & wt %) |
|---|---|---|
| 1. | 40 | 60 of (a) |
| 2. | 50 | 50 of (b) |
| 3. | 62 | 38 of (c) |

-continued

| | CEES wt % | Aqueous Mixture (type & wt %) |
|---|---|---|
| 4. | 8 | 92 of (d) |

As in Example 1 it is evident that an aqueous system containing from 20% w/w upwards of water wherein the balance comprises equal parts w/w of cetyl trimethylammonium bromide and sulfolane is capable of forming stable microemulsions with a wide range of quantities of CEES. The range covers an amount of CEES which is an order of magnitude less than the amount of the aqueous system to a point where CEES is present in a considerably greater quantity than the aqueous system.

EXAMPLE 3

The procedure of Example 2 is repeated except that the sulfolane cosurfactant is replaced with 3-methylsulfolane. Because of this difference, the emulsifier system of this example is referred to as E'.

The following aqueous compositions are initially prepared.

| | W wt % | E wt % |
|---|---|---|
| Aqueous Mixture (a) | 20 | 80 |
| Aqueous Mixture (b) | 42 | 58 |
| Aqueous Mixture (c) | 71 | 29 |
| Aqueous Mixture (d) | 88 | 12 |

The resulting aqueous mixtures are titrated with CEES in accordance with the procedure of Example 2. The compositions of the resulting final mixtures are as noted below:

| | CEES wt % | Aqueous Mixture (type & wt %) |
|---|---|---|
| 1. | 39 | 61 of (a) |
| 2. | 52 | 48 of (b) |
| 3. | 20 | 80 of (c) |
| 4. | 8 | 92 of (d) |

As in Example 2, it is evident that an aqueous system containing from 20% w/w upwards of water wherein the balance comprises equal parts w/w of cetyl trimethylammonium bromide and 3-methylsulfolane is capable of forming stable microemulsions with a wide range of quantities of CEES. As in Example 2, the range covers an amount of CEES which is an order of magnitude less than the amount of the aqueous system to a point where CEES is present in a considerably greater quantity than the aqueous system. It is evident that 3-methylsulfolane as a cosurfactant functions as well as sulfolane. It is also evident that since sulfolane and 3-methylsulfolane do not interreact, a mixture of the two may also be gainfully utilized as a cosurfactant.

EXAMPLE 4

The procedure of Example 2 is repeated except that seawater is used in place of fresh water.

Four initial aqueous compositions are prepared. Each composition is titrated with enough CEES to produce stable microemulsions having the compositions noted below:

| | Seawater wt % | E wt % | CEES wt % |
|---|---|---|---|
| 1. | 29.4 | 49.6 | 21 |
| 2. | 33.3 | 47.7 | 19 |
| 3. | 40.0 | 45.0 | 15 |
| 4. | 52.0 | 37.0 | 11 |

As in Example 2, it is evident that an aqueous system comprising seawater in admixture with equal parts w/w of cetyl trimethylammonium bromide and sulfolane functions equally as well as an aqueous system comprising fresh water in forming stable microemulsions with widely ranging quantities of CEES. It is evident that the presence of electrolytes introduced by seawater has no adverse effect upon the detoxification ability of the microemulsions underlying the present invention. This finding is corroborated by the results of Example 5 which follows.

EXAMPLE 5

The following aqueous compositions are prepared:

| System | Aqueous Component wt % | Emulsifier (E or E') wt % |
|---|---|---|
| (i) | 80 (water) | 20 (E) |
| (ii) | 80 (water) | 20 (E) |
| (iii) | 80 (water) | 20 (E') |
| (iv) | 80 (seawater) | 20 (E) |

Compositions (i) through (iv) are titrated with CEES in accordance with the procedure of the preceding four examples. However, composition (i) is titrated with TBP and not with CEES. The percentages by weight of TBP or CEES in the resulting isotropic microemulsions are as follows:

| System | TBP or CEES wt % |
|---|---|
| (i) | 16 (TBP) |
| (ii) | 2 (CEES) |
| (iii) | 2 (CEES) |
| (iv) | 2 (CEES) |

EXAMPLE 6

The following aqueous compositions were prepared to test whether in the respective emulsifier systems, the cationic surfactant could be effectively replaced by a nonionic surfactant, namely polyoxyethylene octylphenol ether.

A mixed emulsifier (e) is prepared by mixing together equal quantities w/w of said nonionic surfactant with sulfolane. In a similar mixture sulfolane is replaced by 3-methylsulfolane to produce emulsifier system e'.

The following aqueous systems are prepared:

| SYSTEM | AQUEOUS COMPONENT wt % | EMULSIFIER (e or e') wt % |
|---|---|---|
| (a) | 80 (water) | 20 (e) |
| (b) | 80 (water) | 20 (e) |
| (c) | 80 (seawater) | 20 (e') |
| (d) | 80 (seawater) | 20 (e') |

Compositions (a) and (c) are titrated with CEES and compositions (b) and (d) are titrated with TBP.

In the resulting isotropic microemulsions TBP and CEES are found to be present to the extent of up to 16% w/w.

It is therefore evident that in the microemulsions underlying the present invention, it makes no difference that the cosurfactant is sulfolane or 3-methylsulfolane (or a mixture thereof) and that the aqueous phase is fresh water or seawater or a mixture thereof. The ability of the microemulsions underlying the present invention to emulsify any chemical warfare agent analog varies from substrate to substrate as is to be expected.

To a person of ordinary skill in the art to which this invention pertains many modifications and variations will suggest themselves, without the need for any undue experimentation to suit the needs of any given situation. Such modifications and variations are therefore within the scope of the present invention.

The scope of the present invention is further defined by and should be read in conjunction with the appended claims.

What is claimed is:

1. A microemulsion which comprises from about 1% w/w to about 98% w/w of water, from about 1% w/w to about 98% w/w of a cationic surfactant and from about 1% w/w to about 98% w/w of a cosurfactant selected from the group consisting of sulfolane, 3-methylsulfolane and mixtures thereof.

2. The microemulsion of claim 1 wherein the cationic surfactant is cetyl trimethylammonium bromide.

3. The microemulsion of claim 1 which comprises equal quantities w/w of the cationic surfactant and the cosurfactant.

4. The microemulsion of claim 3 wherein the cosurfactant is sulfolane.

5. The microemulsion of claim 3 wherein the cosurfactant is 3-methylsulfolane.

6. A process for the detoxification of chemical warfare agents which comprises the step of solubilizing said chemical warfare agents in the microemulsion of claim 1.

7. A process for the detoxification of chemical warfare agents which comprises the step of oxidizing said chemical warfare agents by the microemulsion of claim 1.

8. A process for the detoxification of chemical warfare agents which comprises the step of hydrolyzing said chemical warfare agents by the microemulsion of claim 1.

9. The microemulsion of claim 1 which comprises from about 20% w/w to about 92% w/w of water, from about 4% to about 40% w/w of cetyl trimethylammonium bromide as a cationic surfactant and from about 4% w/w to about 40% w/w of sulfolane as a cosurfactant.

10. The microemulsion of claim 1 which comprises from about 20% w/w to about 88% w/w of water, from about 6% w/w to about 40% w/w of cetyl trimethylammonium bromide as a cationic surfactant and from about 6% w/w to about 40% w/w of 3-methylsulfolane as a cosurfactant.

11. A microemulsion which comprises from about 1% w/w to about 98% w/w of seawater, from about 1% w/w to about 98% w/w of a cationic surfactant and from about 1% w/w to about 98% w/w of a cosurfactant selected from the group consisting of sulfolane, 3-methylsulfolane and mixtures thereof.

12. The microemulsion of claim 11 wherein the cationic surfactant is cetyl trimethylammonium bromide.

13. The microemulsion of claim 11 which comprises equal quantities w/w of the cationic surfactant and the cosurfactant.

14. The microemulsion of claim 13 wherein the cosurfactant is sulfolane.

15. The microemulsion of claim 13 wherein the cosurfactant is 3-methylsulfolane.

16. A process for the detoxification of chemical warfare agents which comprises the step of solubilizing said chemical warfare agents in the microemulsion of claim 11.

17. A process for the detoxification of chemical warfare agents which comprises the step of oxidizing said chemical warfare agents by the microemulsion of claim 11.

18. A process for the detoxification of chemical warfare agents which comprises the step of hydrolyzing said chemical warfare agents by the microemulsion of claim 11.

19. The microemulsion of claim 11 which comprises from about 38% w/w to about 58% w/w of seawater, from about 21% w/w to about 31% w/w of cetyl trimethylammonium bromide as a cationic surfactant and from about 21% w/w to about 31% w/w of sulfolane as a cosurfactant.

20. A microemulsion which comprises from about 1% w/w to about 98% w/w of water, from about 1% w/w to about 40% of a nonionic surfactant and from about 1% w/w to about 98% w/w of a cosurfactant selected from the group consisting of sulfolane, 3-methylsulfolane and mixtures thereof.

21. The microemulsion of claim 20 wherein the nonionic surfactant is polyoxyethylene octylphenol ether.

22. The microemulsion of claim 20 which comprises equal quantities w/w of the nonionic surfactant and the cosurfactant.

* * * * *